Jan. 10, 1950  J. P. FAY  2,494,291
RHYTHMIC CYCLE INDICATOR
Filed Aug. 6, 1946
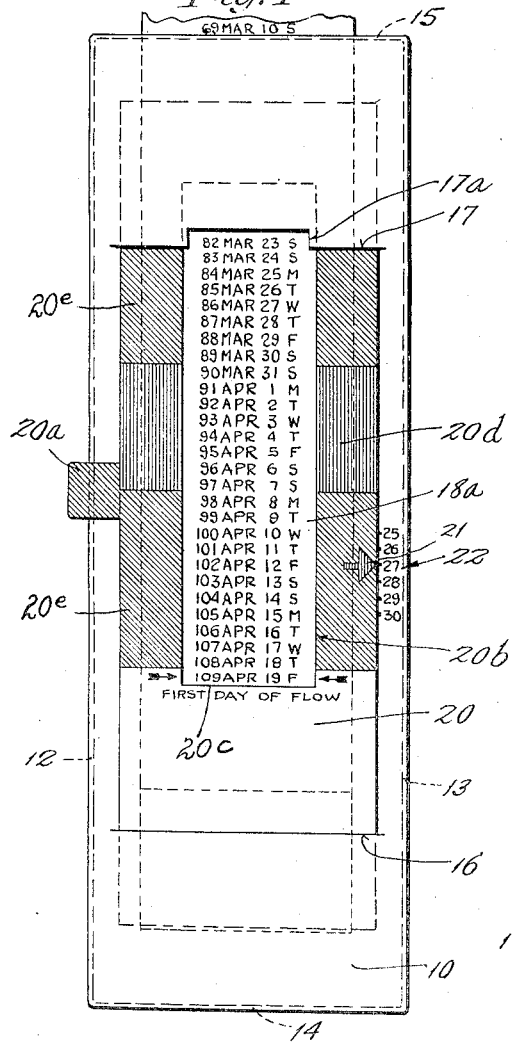
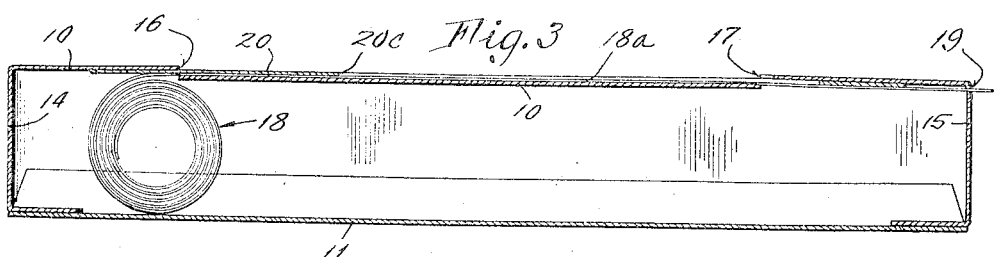
INVENTOR.
James P. Fay
BY
Johnson, Kline and Hensel
ATTORNEYS Patented Jan. 10, 1950

2,494,291

UNITED STATES PATENT OFFICE 2,494,291

RHYTHMIC CYCLE INDICATOR

James P. Fay, Norwalk, Conn., assignor to The Predictor Corporation, Norwalk, Conn., a corporation of Connecticut Application August 6, 1946, Serial No. 688,787

6 Claims. (Cl. 235—86)

The present invention relates to a device for indicating the fecundity rhythm for women and more particularly to a unitary device which has means whereby the data for determining the rhythmic cycle may be recorded and means which may be set at the beginning of the menstrual period of any woman in accordance with the cycle and which will automatically visually indicate the period of probable fertility and the periods of probable sterility during the subsequent cycle.

Recently disclosed scientific investigations have brought to light the fact that with the average woman who is normal in the menstrual cycle within limits of from twenty-six to thirty-one days, ovulation takes place, not as heretofore supposed at or about the time of menstruation, but at a time some thirteen to fifteen days before the beginning of menstruation. These investigations and scientific findings have revealed that with normal women, as above recited, the time of ovulation may vary two or three days, and that spermatozoa may remain viable for a period of about two days after being deposited. There is thus only a period of five to six days during the cycle of such a normal woman in which fecundation can take place. Even though these recently discovered facts are known, their application in any particular place is rendered more or less impracticable by reason of the difficulty in calculating the periods and in remembering from time to time the considerably extended periods involved.

The present invention overcomes these difficulties by providing a simple and inexpensive indicator which provides for the recording of data over a period for which the device is intended which will establish the rhythmic cycle and an easily operated indicator which when set in accordance with the cycle determined from the recorded data will directly and visually indicate the periods of fertility and sterility.

Other features and advantages of the invention will be apparent from the specification and claims when considered in connection with the drawings in which:

Figure 1 is a top plan view of the indicator.

Fig. 2 is a bottom view of the indicator; and

Fig. 3 is a longitudinal section of the container.

As shown in the drawings, the container comprises a box-like structure having a top 10, bottom 11 and side and end walls 12, 13, 14 and 15. The container is preferably made of paper, cardboard or other inexpensive material which may be readily discarded at the end of the period for which the device is intended. However, if a more permanent container is desired, it may be made of metal, plastic or other similar material.

The top of the container is provided with slits 16, 17 adjacent the ends thereof. Disposed within the container is a continuous tape 18 having the days of the calendar year marked thereon progressively within uniform day spaces. While the month and date may be sufficient for some usage, it is at present preferred to include the day of the year adjacent each month and date for the purposes of facilitating the computing of the rhythmic cycle as will be described.

The continuous tape is of a sufficient length to include at least 12 and preferably 13 months and is stored within the container in any suitable manner. In the herein illustrated form of the invention it is rolled into a coil and positioned within the container through the bottom which may be hinged along one side so that it can be swung back to afford access to the interior. With the bottom swung back, the leading end of the calendar is inserted through the slit 16 so that a portion 18a overlies the outer surface of the top. The end is then threaded in through the slit 17 so that a predetermined portion of the calendar is exposed. While the end of the tape may be taken-up by any suitable take-up, for example, such as employed in a photographic roll film system, it is at present preferred to avoid such mechanism and to extend the end through a slit 19 in the end of the wall 15 so that it may be drawn therethrough as subsequent portions of the tape are moved to exposed position. The tape which projects from the end may be torn off and discarded after it has been used.

A slide 20 is positioned over the top to overlie the exposed portion of the tape, its ends passing through the slits 16 and 17 so as to be slidably mounted therein. The slide may be provided with a tab 20a to facilitate its adjustment and has a window 20b for exposing a predetermined number of days on the calendar extending over the top surface as determined by its setting, as will be described.

The tape and slide will be automatically held in their adjusted positions against casual and accidental movement. As noted in Fig. 3, the slide causes a depression of the center portion of the top (exaggerated in the drawing) so that it is gripped by the material of the top as it passes through the slits 16, 17. This will provide an additional hold for the tape which is also held against unintentional movement due to its tortuous path as it moves through the slits.

In order to properly adjust the slide, means is provided whereby its position may be set in accordance with any required period. Herein illustrated, it is provided with an arrow 21 and the container adjacent the arrow is provided with indicia 22, corresponding to the number of days in the cyclic periods. The indicia and arrow are so arranged that when the arrow is positioned opposite one of the number of the indicia, the slide will be located so that the lower edge of the window 20c is disposed the required number of day spaces from the edge of the slit 17 so that the corresponding number of days constituting the next rhythmic cyclic are automatically exposed in the window. If desired the predicted first day of flow may also be exposed and indicated as herein illustrated.

Adjacent the window, the slide is provided with means which automatically indicates which of the days exposed within the window constitute periods of most probably fertility and which constitute periods of most probable sterility. As shown in the drawings the indicia representing the period of most probable fertility comprises a band 20d located twelve day spaces from the edge 20c of the window. The width of the band is equal eight day spaces which is slightly in excess of the five or six days noted above to accommodate for slight variations in the cycle and its position above the edge is based on the fact that ovulation is approximately 14 days before the beginning of menstruation. Since the period covered by band 20d is the only period during the cycle in which there will be probable fertility, all other days in the cycle before and after this period will constitute periods of sterility.

To aid in distinguishing the periods, it is preferred to color the band 20d a distinctive color from periods of sterility which are indicated by bands 20e on the slide, for example, by making it black on white; or red on green so that it can be readily visibly determined in which of the periods any day in the exposed cycle will be.

The device of the present invention also includes a recording means as an integral part thereof whereby the rhythmic cycle may be determined and a record of the required data made.

In the present preferred form of the invention, the recording means is provided on the bottom surface of the container. If the container is of paper or the like it may be ruled as shown in Fig. 2 to receive directly thereon the data relative to the menstrual period which determines the rhythmic cycle of the individual. If the container is of metal, a chart may be secured thereto to receive the data. While these charts may vary in different particularities as required, the present preferred chart includes a space for the date, the number of the day in the year and the interval between menstruations.

As is illustrated herein in Fig. 2, the beginning of the menstrual cycle period was the 4th of January, which is the 4th day of the year. This data is inserted in the first line. The beginning of the next menstrual period was the 30th day of January, the 30th day of the year and indicated in the second column. The difference between 4 and 30, which is the interval between menstruations, was noted and a mark is placed in the box under column 26. The next period was February 24, the number of the day of the year being 55. The difference between 30 and 55 was noted and a mark is placed in column 25. The next period began on March 23 which is the 82nd day of the year. The difference between 55 and 82 was noted and a mark placed in column 27. This process is repeated throughout the period for which the device is intended and the chart will not only provide a record but will clearly indicate the rhythmic cycle of the person using the device.

As shown in Fig. 1, the tape has been adjusted so that March 23, the first day of flow of the last menstrual period, is located adjacent slit 17. If preferred the edge of slit 17 overlying the tape may be recessed as at 17a to provide a box to aid in locating the tape during adjustment. From the record on the back it has been determined that the cycle is 27 days. The slide is adjusted so that the arrow on the slide is opposite the indicia 27 on the casing. The window, therefore, exposes the next 27 days which represent the next cyclic period plus the first day of flow of the succeeding cycle. The band 20d automatically visually indicates the days in the cycle of most probable fertility. These are from March 31 to April 7. The bands 20e visually indicate the days of probable sterility. These are from March 23 to March 30 and from April 8 to April 18. April 19 is indicated as the first day of flow of the succeeding cycle.

Thus, it will be seen that the device of the present invention provides an accurate record of the rhythmic cycle and a simple, inexpensive indicator which is easily operated and automatically and directly visually indicates the periods of most probable fertility and sterility and the predicted first day of flow for the succeeding cycle.

Variations and modifications may be made within the scope of this invention and portions of the improvements may be used without others.

I claim:

1. A rhythmic cycle indicator comprising a container having top, bottom, and end and side walls, the top having transverse slits therein adjacent each end; a continuous calendar tape disposed within the container and having a portion extending through one slit over the outer surface of the top and through the other slit, said tape having the days of the calendar year marked thereon progressively within uniform day spaces and being adjustable to position successive portions over said top surface; and a slide adjustably mounted in the slits in the top to overlie the tape, said slide having a window therein for exposing a predetermined number of days on the calendar extending over the top surface and having means thereon for indicating which of the days included within the window constitute a period of probable fertility and which constitute a period of probable sterility.

2. A rhythmic cycle indicator comprising a container having top, bottom and end and side walls, the top having transverse slits therein adjacent each end and one end having a transverse slit therein; a continuous calendar tape disposed within the container, one end of said tape extending through one slit in the top, over the outer surface of the top, through the other slit and out of the container through the slit in the end wall, said tape having the days of the calendar year marked thereon progressively within uniform day spaces and being adjustable to position successive portions of said tape over the top surface, the tortuous path of the tape holding the tape against unintentional movement; and a slide adjustably mounted in the slits in the top to overlie the tape, said slide having a window therein for exposing a predetermined number of days on the calendar extending over the top surface and having means thereon for indicating which of the days included within the window constitute a period of probable fertility and which constitute a period of probable sterility.

3. A rhythmic cycle indicator comprising a container having top, bottom and end and side walls, the top having transverse slits therein adjacent each end; a continuous calendar tape disposed within the container and having a portion thereof overlying the outer surface of the top between said slits, said tape having the days of the calendar year marked thereon progressively within uniform day spaces and being adjustable to position successive portions of said tape over the top surface, a part of the container having cycle indicia and cooperating record means thereon for receiving data from the tape to determine the rhythmic cycle; and a slide adjustably mounted in the slits on the top to overlie the tape, said slide having means cooperating with similar cycle indicia on the top of the container for determining the position of the slide in accordance with the rhythmic cycle recorded on the record means, and a window therein for exposing a number of days on the calendar extending over the top surface corresponding to the cycle, the slide having means thereon adjacent the window for indicating which of the days included within the window constitute a period of probable fertility and which constitute a period of probable sterility.

4. A rhythmic cycle indicator comprising a container having top, bottom and end and side walls, the top having transverse slits therein adjacent each end and one end having a transverse slit therein; a continuous calendar tape disposed within the container, one end of said tape extending through one slit in the top, over the outer surface of the top, through the other slit, and out of the container through the slit in the end wall, said tape having the days of the calendar year marked thereon progressively within uniform day spaces and being adjustable to position successive portions of said tape over the top surface, the bottom of the container having cycle indicia and cooperating record means thereon for receiving data from the tape to determine the rhythmic cycle; and a slide adjustably mounted in the slits on the top to overlie the tape, said slide having means cooperating with similar cycle indicia on the top of the container for determining the position of the slide in accordance with the rhythmic cycle recorded on the back, and a window therein for exposing a number of days on the calendar extending over the top surface corresponding to the cycle, the slide having means thereon adjacent the window for indicating which of the days included within the window constitute a period of probable fertility and which constitute a period of probable sterility.

5. A rhythmic cycle indicator comprising a container having top, bottom and end and side walls, the top having transverse slits therein adjacent each end; a continuous calendar tape disposed within the container and having a portion extending through one slit over the outer surface of the top and through the other slit, said tape having the days of the calendar year marked thereon progressively within uniform day spaces and being adjustable to position successive portions over said top surface; and a slide adjustably mounted in the slits in the top to overlie the tape, said slide having a window therein for exposing a predetermined number of days on the calendar extending over the top surface and having distinctively colored bands thereon for indicating which of the days included within the window constitute a period of probable fertility and which constitute a period of probable sterility.

6. A rhythmic cycle indicator comprising a base provided with a chart, having cycle indicia thereon, for receiving data for determining the rhythmic cycle and providing a record thereof; a calendar means mounted on the base; indicating means adjustably mounted on the base adjacent the calendar means and being settable to various cyclic positions with respect to the calendar means to automatically indicate on the calendar the periods of most probably fertility and most probable sterility in the next rhythmic cycle; and cooperable means on the base and said indicating means, including indicia corresponding to the cycle indicia on the chart, for setting said indicating means to a predetermined cyclic position in accordance with the cycle determined by the indicia on the chart.

JAMES P. FAY.

REFERENCES CITED

The following references are of record in the file of this patent:

UNITED STATES PATENTS

| Number | Name | Date |
| --- | --- | --- |
| 104,478 | McAdams | June 21, 1870 |
| 859,052 | Dozier | July 2, 1907 |
| 1,555,190 | Currin | Sept. 29, 1925 |
| 1,558,020 | Lauer | Oct. 20, 1925 |
| 1,983,062 | Anderson | Dec. 4, 1934 |
| 2,134,928 | Rahn | Nov. 1, 1938 |
| 2,161,345 | Gates | June 6, 1939 |